(12) United States Patent
Coatney et al.

(10) Patent No.: US 8,949,863 B1
(45) Date of Patent: Feb. 3, 2015

(54) CREATING ENVIRONMENTAL SNAPSHOTS OF STORAGE DEVICE FAILURE EVENTS (75) Inventors: Doug Coatney, Sunnyvale, CA (US); Sharon Gavarre, Sunnyvale, CA (US)

(73) Assignee: Netapp, Inc., Sunnyvale, CA (US)

( * ) Notice: Subject to any disclaimer, the term of this patent is extended or adjusted under 35 U.S.C. 154(b) by 1509 days.

(21) Appl. No.: 12/112,427

(22) Filed: Apr. 30, 2008

(51) Int. Cl.
*G06F 9/54* (2006.01)

(52) U.S. Cl.
USPC ............................................. 719/327; 714/43

(58) Field of Classification Search
CPC .......................... G06F 11/0766; G06F 11/0727
See application file for complete search history.

(56) References Cited

U.S. PATENT DOCUMENTS

| | | | | |
|---|---|---|---|---|
| 5,123,017 | A | * | 6/1992 | Simpkins et al. ................ 714/26 |
| 5,539,690 | A | * | 7/1996 | Talreja et al. ............. 365/185.22 |
| 5,838,891 | A | * | 11/1998 | Mizuno et al. ................ 714/5.11 |
| 6,460,151 | B1 | * | 10/2002 | Warwick et al. .............. 714/718 |
| 7,136,768 | B1 | * | 11/2006 | Shah et al. ..................... 702/115 |
| 2002/0054477 | A1 | * | 5/2002 | Coffey et al. .................. 361/686 |
| 2003/0093586 | A1 | * | 5/2003 | Sumiyoshi et al. ................ 710/1 |
| 2005/0108473 | A1 | * | 5/2005 | Le Moal et al. ................ 711/113 |
| 2005/0278575 | A1 | * | 12/2005 | Nicholson et al. ............... 714/37 |
| 2008/0140931 | A1 | * | 6/2008 | Nakamura et al. ............ 711/114 |

OTHER PUBLICATIONS

Judy Mottl, Don't blame disks for every storage failure, Feb. 25, 2008, p. 1.*

* cited by examiner

*Primary Examiner* — H S Sough
*Assistant Examiner* — Syed Roni
(74) *Attorney, Agent, or Firm* — Perkins Coie LLP (57) ABSTRACT

A storage device failure in a computer storage system can be analyzed by the storage system by examining relevant information about the storage device and its environment. Information about the storage device is collected in real-time and stored; this is an on-going process such that some information is continuously available. The information can include information relating to the storage device, such as input/output related information, and information relating to a storage shelf where the storage device is located, such as a status of adjacent storage devices on the shelf. All of the relevant information is analyzed to determine a reason for the storage device failure. Optionally, additional information may be collected and analyzed by the storage system to help determine the reason for the storage device failure. The analysis and supporting information can be stored in a log and/or presented to a storage system administrator to view.

20 Claims, 5 Drawing Sheets

CREATING ENVIRONMENTAL SNAPSHOTS OF STORAGE DEVICE FAILURE EVENTS

FIELD OF INVENTION

The present invention is generally related to analyzing storage device failures, and more particularly, to a method for analyzing data relating to a storage device failure to determine a reason for the failure.

BACKGROUND

When a storage device fails, the cause of the failure is not often easily understood. When a storage device fails, it can record an error condition, including information regarding hardware errors, recoverable errors, and other environmental data. The storage device then notifies the system that it is connected to of the error, and the system logs the error in a general system log. The error is logged at the time the error occurs.

A general system log is a file that contains a history of everything that happens on the system. The logging functionality runs in the background (i.e., it is always running) and is used by the operating system and the applications and services available on the system to record information. The log's location can be determined by a system administrator, but the log is generally stored in a location that is accessible by all of the components of the system, such as on a centrally located host.

A log entry is generated for each individual event, including system logins and failures reported by different hardware and software. Because the system log stores information about all components of the system, the log file can become large rather quickly. The problem with the general system log is that it, by its definition, provides a history of everything that has happened in the system. But the system log is not concise, such that finding information related to a single failed disk, for example, can be difficult.

A problem arises in that the general system log contains a large amount of information about events occurring throughout the system, not just about storage device-related errors. To be able to determine a reason why a storage device failed, the log needs to be review to locate all of the information about the failed storage device. This problem becomes more pronounced as the number of storage devices in the system increases, because the general system log will become larger. It then becomes more difficult to find all of the information relating to a single storage device in the log, since the information will be sprinkled throughout the log in various places.

For example, if a storage device generated errors periodically (as opposed to several errors all at the same time), the log would have to be reviewed over a potentially large period of time to find all of the errors relating to a single storage device. Furthermore, because different types of errors can be related to the failure of a single storage device, a person reviewing the log needs to have knowledge of the storage device, how the storage device is connected to the storage system, and where in the log to look for all of the information relevant to the storage device. This is a manual process that is time-consuming and there is a possibility that the person reviewing a log may miss a piece of information that is important in analyzing why the storage device failed.

If detailed information on the history of the storage device was available and the storage device has stopped communicating with the system, the history information can be examined to help determine why the storage device failed. The information can help summarize why the storage device failed and provide a conclusive reason as to why the storage device is currently inaccessible. For example, there may have been a specific error encountered by the storage device that caused it to fail or there may have been a series of errors over time that indicated that the device would fail soon.

Existing approaches return pages of error messages and status messages, and it is left to a storage system administrator to determine a reason for the storage device failure. There is therefore a need to collect all of the information relevant to a storage device failure in one location for easier analysis of the reason for the failure and reporting this information to a storage system administrator or other user with appropriate privileges.

SUMMARY

A storage device failure can be analyzed by examining relevant information about the storage device and its environment in a timely manner. Information about the storage device is collected and stored; this is an on-going process such that some information is continuously available. If it is determined that the storage device has failed, additional information about the storage device is gathered. The information can include information relating to the storage device, such as input/output related information, and information relating to a storage shelf on which the storage device is located, such as a status of adjacent storage devices on the shelf. All of the relevant information is analyzed to determine a reason for the storage device failure. The analysis and supporting information can be stored in a log and/or presented to a storage system administrator to view.

There are a number of separate "pools" of information relevant to a storage device, each of which may indicate a storage device failure. However, a single "pool" of information may not directly indicate an obvious storage device failure and it may be necessary to access several "pools" of information to determine that a storage device has failed. By using the actual storage device failure as a fixed point in time, it is possible to pull the relevant information from the "pools" of information together to determine that a storage device has failed. By fixing the point in time of the storage device failure, additional information from device drivers and other statistics about the storage device can be collected and correlated. The correlation of the different "pools" of information requires the involvement of the filer that is experiencing a problem accessing the storage device, since at least some of the relevant information resides on the filer. Without having the fixed point in time to correlate the information, it may not be possible to collect all of the relevant information because some of the data may not be able to be located without the fixed time reference.

There are two scenarios for storage device failures. In a first scenario, it is possible to specifically provide a reason for the storage device failure. In this scenario, there is little or no administrator analysis of the information and there is some intelligence on the part of the system (in the filer that experiencing the problem with the storage device) to identify the reason for the failure. In a second scenario, the storage device failure is reported along with the final problem that caused the failure. However, there may have been several other problems leading up to the final problem that caused the failure. In this scenario, the administrator can detect the other problems that led to the failure be reviewing the information presented with the failure report.

BRIEF DESCRIPTION OF THE DRAWINGS

A more detailed understanding of the invention may be had from the following description of preferred embodiments, given by way of example, and to be understood in conjunction with the accompanying drawings, wherein.

DETAILED DESCRIPTION OF THE PREFERRED EMBODIMENTS

It is noted that the following description involves a storage shelf with multiple storage devices. The term "storage device" can include, but is not limited to, a disk drive, a solid state storage device (e.g., a flash memory device), a tape device, and a media changer. The present invention operates in a similar manner in any multiple storage device environment, for example, a RAID subsystem. In one embodiment described herein, the invention is implemented in a disk shelf having multiple disk drives. It will be understood by one of skill in the art that the principles of the invention are equally applicable to a generalized storage shelf having multiple storage devices.

A storage device failure can be analyzed by examining relevant information about the storage device and its environment in a timely manner. Information about the storage device is collected and stored; this is an on-going process such that some information is continuously available. If it is determined that the storage device has failed, additional information about the storage device is gathered. The information can include information relating to the storage device, such as input/output related information, and information relating to a storage shelf on which the storage device is located, such as a status of adjacent storage devices on the shelf. All of the relevant information is analyzed to determine a reason for the storage device failure. The analysis and supporting information can be stored in a log and/or presented to a storage system administrator to view.

The present invention provides an improvement over previously known analysis methods. By collecting all of the information relevant to a storage device failure in one location (as opposed to being spread through the general system log), the reason for the failure can be more easily determined. In addition, storage device manufacturers have made more diagnostic information about the device (which had not previously been available) accessible to a storage administrator which is useful in determining a reason for the failure.

There are two scenarios for storage device failures. In a first scenario, it is possible to specifically provide a reason for the storage device failure. In this scenario, there is little or no administrator analysis of the information and there is some intelligence on the part of the system (in the filer that experiencing the problem with the storage device) to identify the reason for the failure. In a second scenario, the storage device failure is reported along with the final problem that caused the failure. However, there may have been several other problems leading up to the final problem that caused the failure. In this scenario, the administrator can detect the other problems that led to the failure be reviewing the information presented with the failure report.

SETTING OF THE INVENTION

A storage server (also known as a "filer") is a computer that provides file services relating to the organization of information on storage devices, such as disks. The filer includes a storage operating system that implements a file system to logically organize the information as a hierarchical structure of directories and files on the disks. Each "on-disk" file may be implemented as a set of disk blocks configured to store information, whereas the directory may be implemented as a specially-formatted file in which information about other files and directories are stored. A filer may be configured to operate according to a client/server model of information delivery to allow many clients to access files stored on the filer. In this model, the client may include an application, such as a file system protocol, executing on a computer that connects to the filer over a computer network. The computer network can include, for example, a point-to-point link, a shared local area network (LAN), a wide area network (WAN), or a virtual private network (VPN) implemented over a public network such as the Internet. Each client may request filer services by issuing file system protocol messages (in the form of packets) to the filer over the network.

A common type of file system is a "write in-place" file system, in which the locations of the data structures (such as inodes and data blocks) on disk are typically fixed. An inode is a data structure used to store information, such as metadata, about a file, whereas the data blocks are structures used to store the actual data for the file. The information contained in an inode may include information relating to: ownership of the file, access permissions for the file, the size of the file, the file type, and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is read from disk into memory and "dirtied" with new data, the data block is written to a new location on the disk to optimize write performance. A write-anywhere file system may initially assume an optimal layout, such that the data is substantially contiguously arranged on the disks. The optimal disk layout results in efficient access operations, particularly for sequential read operations. A particular example of a write-anywhere file system is the Write Anywhere File Layout (WAFL®) file system available from NetApp®. The WAFL file system is implemented within a microkernel as part of the overall protocol stack of the filer and associated disk storage. This microkernel is supplied as part of NetApp's Data ONTAP® storage operating system, residing on the filer, that processes file service requests from network-attached clients.

As used herein, the term "storage operating system" generally refers to the computer-executable code operable on a storage system that manages data access. The storage operating system may, in case of a filer, implement file system semantics, such as the Data ONTAP® storage operating system. The storage operating system can also be implemented as an application program operating on a general-purpose operating system, such as UNIX® or Windows®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes. Each volume is associated with its own file system and as used herein, the terms "volume" and "file system" are interchangeable.

The disks within a volume can be organized as a Redundant Array of Independent (or Inexpensive) Disks (RAID). RAID implementations enhance the reliability and integrity of data storage through the writing of data "stripes" across a given number of physical disks in the RAID group, and the appropriate storing of parity information with respect to the striped data. In the example of a WAFL® file system, a RAID 4 implementation is advantageously employed, which entails striping data across a group of disks, and storing the parity within a separate disk of the RAID group. As described herein, a volume typically comprises at least one data disk and one associated parity disk (or possibly data/parity) partitions in a single disk arranged according to a RAID 4, or equivalent high-reliability, implementation.

Network Environment

Figure 1:
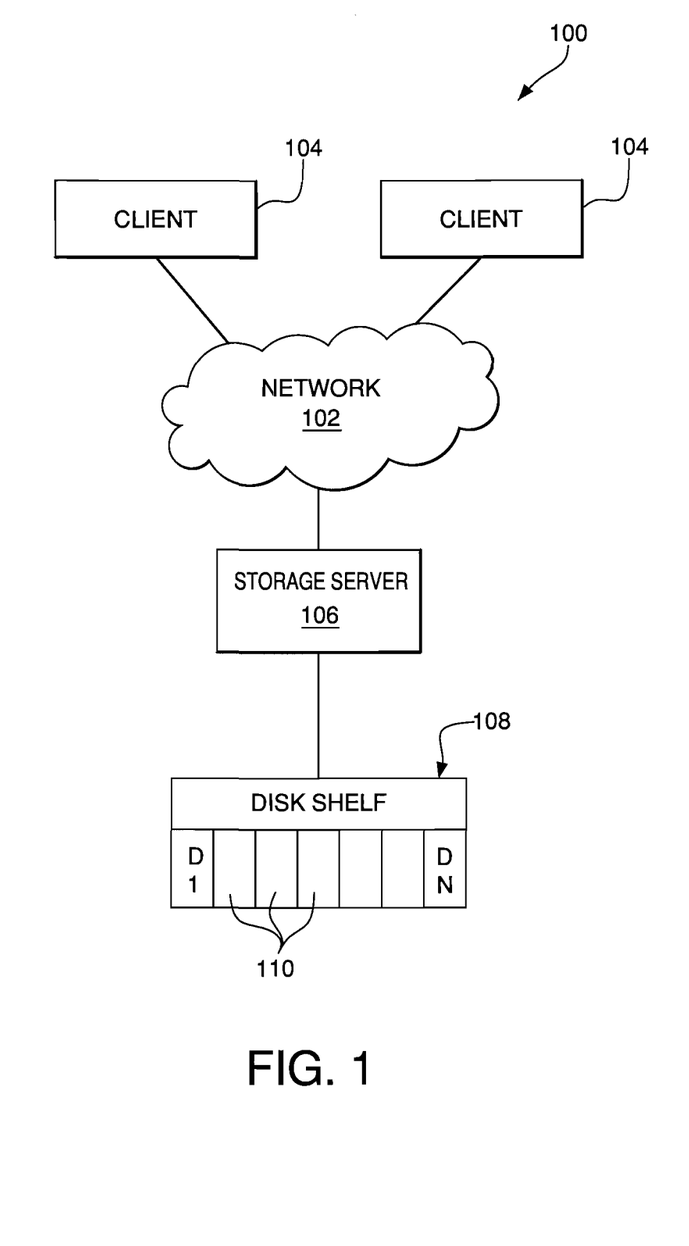
FIG. 1 is a block diagram of a network environment in which the present invention can be implemented.

FIG. 1 is a block diagram of an exemplary network environment 100 in which the principles of the present invention are implemented. The environment 100 is based around a network 102. The network 102 can be a local area network (LAN), a wide area network (WAN), a virtual private network (VPN) using communication links over the Internet, for example, or any combination of the three network types. For the purposes of this description, the term "network" includes any acceptable network architecture.

The network 102 interconnects a number of clients 104 and a storage server 106. The storage server 106 (also referred to as a "filer"), described further below, is connected to a Fibre Channel loop (for example), including a disk shelf 108. The disk shelf 108 includes a number of individual disk drives D1-DN 110 that operate in a manner known in the art. It should be understood that while only one filer and one disk shelf are shown in FIG. 1, multiple filers and disk shelves may be connected in a cluster configuration and operate in a similar manner.

Each of the devices attached to the network 102 includes an appropriate conventional network interface connection (not shown) for communicating over the network 102 using a communication protocol, such as Transport Control Protocol/Internet Protocol (TCP/IP), User Datagram Protocol (UDP), Hyper Text Transport Protocol (HTTP), Simple Network Management Protocol (SNMP), or Virtual Interface (VI) connections.

Storage Server

Figure 2:
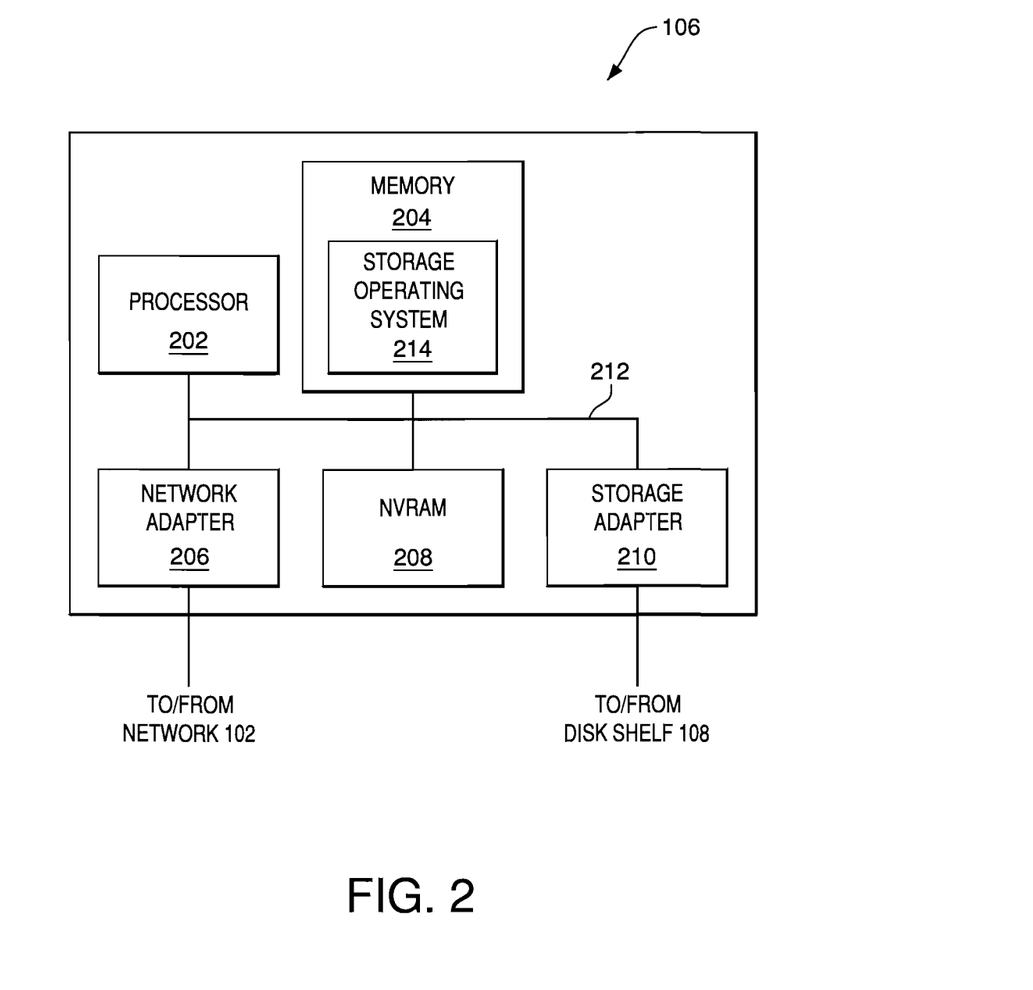
FIG. 2 is a block diagram of the file server shown in FIG. 1.

FIG. 2 is a detailed block diagram of an exemplary storage server ("filer") 106. It will be understood by one skilled in the art that the inventive concepts described herein apply to any type of file server, wherever implemented, including on a special-purpose computer, a general-purpose computer, or a standalone computer.

The storage server 106 includes a processor 202, a memory 204, a network adapter 206, a nonvolatile random access memory (NVRAM) 208, and a storage adapter 210, all of which are interconnected by a system bus 212. Contained within the memory 204 is a storage operating system 214 that implements a file system to logically organize the information as a hierarchical structure of directories and files on the disk shelf 108. In an exemplary embodiment, the memory 204 is addressable by the processor 202 and the adapters 206, 210 for storing software program code. The operating system 214, portions of which are typically resident in the memory 204 and executed by the processing elements, functionally organizes the filer by invoking storage operations in support of a file service implemented by the filer.

The network adapter 206 includes mechanical, electrical, and signaling circuitry needed to connect the filer 106 to clients 104 over the network 102. The clients 104 may be general-purpose computers configured to execute applications, such as database applications. Moreover, the clients 104 may interact with the filer 106 in accordance with a client/server information delivery model. That is, the client 104 requests the services of the filer 106, and the filer 106 returns the results of the services requested by the client 104 by exchanging packets defined by an appropriate networking protocol.

The storage adapter 210 interoperates with the storage operating system 214 and the disk shelf 108 to access information requested by the client 104. The storage adapter 210 includes input/output (I/O) interface circuitry that couples to the disk shelf 108 over an I/O interconnect arrangement, such as a Fibre Channel link. The information is retrieved by the storage adapter 210 and, if necessary, is processed by the processor 202 (or the adapter 210 itself) prior to being forwarded over the system bus 212 to the network adapter 206, where the information is formatted into appropriate packets and returned to the client 104.

In one exemplary implementation, the filer 106 includes a non-volatile random access memory (NVRAM) 208 that provides fault-tolerant backup of data, enabling the integrity of filer transactions to survive a service interruption based upon a power failure or other fault.

Storage Operating System

To facilitate the generalized access to the disk shelf 108, the storage operating system 214 implements a write-anywhere file system that logically organizes the information as a hierarchical structure of directories and files on the disks. As noted above, in an exemplary embodiment described herein, the storage operating system 214 is the NetApp® Data ONTAP® operating system available from NetApp®, that implements the WAFL® file system. It is noted that any other appropriate file system can be used, and as such, where the terms "WAFL®" or "file system" are used, those terms should be interpreted broadly to refer to any file system that is adaptable to the teachings of this invention.

Figure 3:
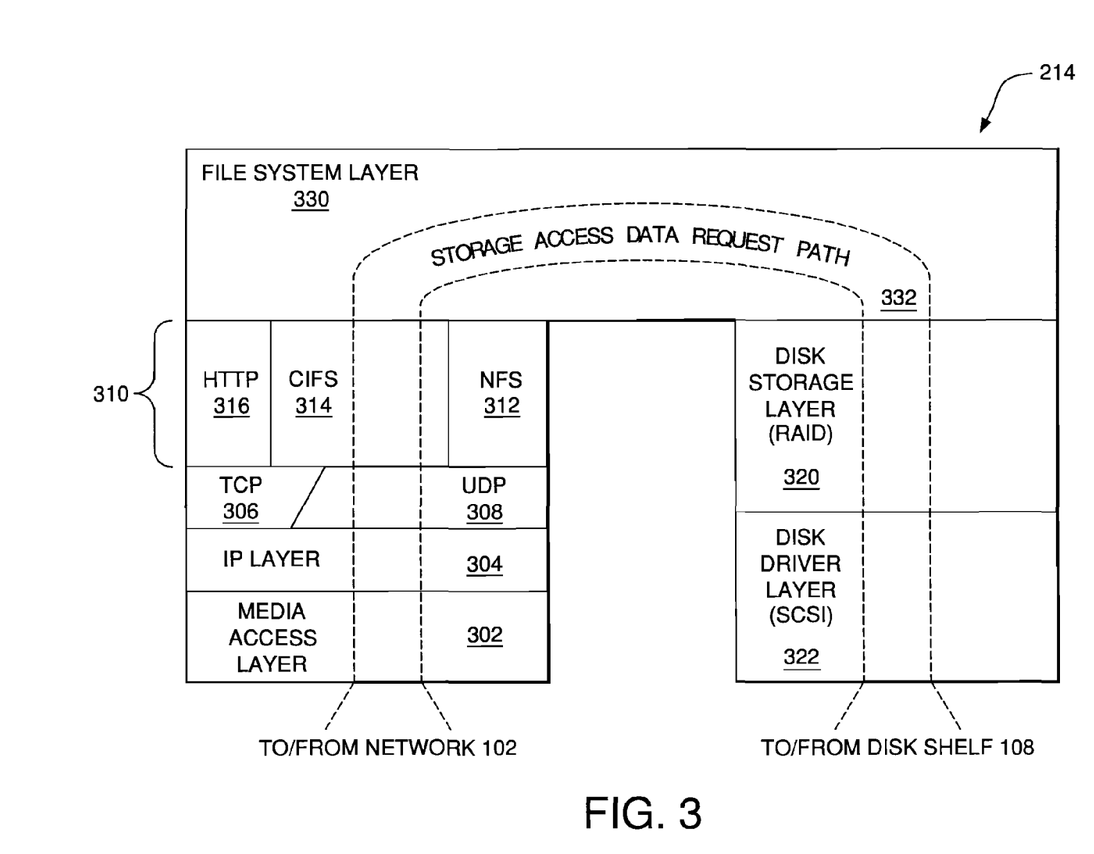
FIG. 3 is a block diagram of the storage operating system shown in FIG. 2.

Referring now to FIG. 3, the storage operating system 214 consists of a series of software layers, including a media access layer 302 of network drivers (e.g., an Ethernet driver). The storage operating system 214 further includes network protocol layers, such as an Internet Protocol (IP) layer 304 and its supporting transport mechanisms, a Transport Control Protocol (TCP) layer 306 and a User Datagram Protocol (UDP) layer 308.

A file system protocol layer 310 provides multi-protocol data access and includes support for the Network File System (NFS) protocol 312, the Common Internet File System (CIFS) protocol 314, and the Hyper Text Transfer Protocol (HTTP) 316. In addition, the storage operating system 214 includes a disk storage layer 320 that implements a disk storage protocol, such as a redundant array of independent disks (RAID) protocol, and a disk driver layer 322 that implements a disk access protocol such as, e.g., a Small Computer System Interface (SCSI) protocol.

Bridging the disk software layers 320-322 with the network and file system protocol layers 302-316 is a file system layer 330. Generally, the file system layer 330 implements a file system having an on-disk format representation that is block-based using data blocks and modes to describe the files.

In the storage operating system 214, a data request path 332 between the network 102 and the disk shelf 108 through the various layers of the operating system is followed. In response to a transaction request, the file system layer 330 generates an operation to retrieve the requested data from the disk shelf 108 if the data is not resident in the filer's memory 204. If the data is not in the memory 204, then the file system layer 330 indexes into an Mode file using the Mode number to access an appropriate entry and retrieve a logical volume block number. The file system layer 330 then passes the logical volume block number to the disk storage layer 320. The disk storage layer 320 maps the logical number to a disk block number and sends the disk block number to an appropriate driver (for example, an encapsulation of SCSI implemented on a Fibre Channel disk interconnection) in the disk driver layer 322. The disk driver accesses the disk block number on the disk shelf 108 and loads the requested data in the memory 204 for processing by the filer 106. Upon completing the request, the filer 106 (and storage operating system 214) returns a reply, e.g., an acknowledgement packet defined by the CIFS specification, to the client 104 over the network 102.

It is noted that the storage access request data path 332 through the storage operating system layers described above may be implemented in hardware, software, or a combination of hardware and software. In an alternate embodiment of this invention, the storage access request data path 332 may be implemented as logic circuitry embodied within a field programmable gate array (FPGA) or in an application specific integrated circuit (ASIC). This type of hardware implementation increases the performance of the file services provided by the filer 106 in response to a file system request issued by a client 104.

Overview of Information Collected

When an individual disk drive (also referred to herein as a "disk") fails, certain information is collected, such as the number of errors encountered by the disk, what those errors are, the number of input/output operations (I/Os) the disk was performing, and the number of I/Os the disk had errors with. The information can be collected for the following categories: disk driver I/O history, adapter driver I/O history, system connectivity summary, and shelf-specific data. It is noted that these categories are illustrative only, and that data outside of these broad categories may also be collected.

The disk-specific information is localized and known to the individual disk driver that is supporting a specific disk. It is also possible to retrieve information that is saved in internal data structures in the disk or the SMART (Self-Monitoring, Analysis and Reporting Technology) data structures that exist with the internals of the disk, such as counters, details on timeouts and errors, and other actions that the disk had been performing. Also, certain statistics may be calculated and saved, such as an average I/O time, a maximum I/O time, a number of failed I/Os, and the number of failed I/Os per total number of I/Os performed, all of which can be used to identify a disk that is working but is beginning to experience problems. It is noted that while some the foregoing information is particular to a disk drive, similar information for any other type of storage device may be collected without altering the operation of the invention.

By having more visibility into some of the disk's diagnostic data, this information can be made available on the system as well. So when a disk does fail, it is possible to review the information that the system has, e.g., a snapshot into the disk internals as well as what the disk "thought" was happening.

Integration with General System Monitoring

As described above, the network environment 100 includes multiple components, including several disk drives. Traditionally, the diagnostic information relating to a single disk has been included in the general system log. As described above, the general system log contains information regarding various events occurring throughout a computer system, and is not limited to information relating to storage devices. Because the general system log can be large, being able to identify the information relating to a specific disk has been a challenge as that information has previously not been in one location.

The specific type of general system log used can vary from system to system, although the basic functionality is similar. One specific example of a type of general system log is the AutoSupport capability from NetApp®. While the discussion herein refers to some capabilities of AutoSupport, the discussion is applicable to any type of general system log, such as the syslog available on a UNIX® system.

The information that is in the filer is volatile, meaning if the filer were to lose power, then all the state information would be lost. The information that is coming from the disk is persistent; the logs are written on the disks themselves. If the disk can be communicated with again to retrieve the log information, it may be possible to determine more information about the cause of the failure. There is also some history information that is written out to files, so as long as the file system is accessible, then at least some of the history information will be recoverable. The history information can include, but is not limited to, shelf log data (i.e., information relating to the disk shelf) and storage health-related information such as media errors and other error counts. In one embodiment, the shelf log data is obtained by polling the disk shelf when an I/O error occurs to be able to time-correlate the I/O error with any errors that may have been reported by the shelf. The history information is stored on the filer.

For all of these disks, one of the things to be determined is whether the disk failed or was removed from the storage system. There is section in the log that indicates whether the disk is still physically connected to the storage system. In one exemplary implementation, the log includes a bitmap to indicate whether a given disk drive is plugged into the storage system, but is in a failed state.

To be able to determine why a particular disk failed, a storage system administrator has to comb through the general system log, trying to locate all of the information in the log related to the failed disk. This can be particularly troublesome in an instance where the disk stopped communicating with the system and there are no relevant log entries.

Sometimes, a disk failure reason can be inferred based on knowledge of how the system works and some disk-specific data. For example, if an I/O request is retried and the I/O request times out multiple times or has errors, it could be inferred that the I/O was never going to work, so the system stopped retrying it. By looking at the specific data, such as whether the maximum allowed number of retries was attempted and that no more paths were available to retry the I/O, and if the system couldn't communicate with the disk, that could be the reason why the disk failed. Inferring that reason implies that the administrator has an understanding of how the system works and the details of what is occurring, which generally is not the case.

Whereas if the system were to alert the storage system administrator or other user with administrator privileges that a particular disk was failed for known reasons based on a known set of information, the administrator would know what occurred and exactly what the issue was. There would not be any inferences as to why the drive was failed—the system would indicate exactly why it stopped communicating with that disk.

In another example, the administrator could look at the system and see collateral information about the locality of the shelf and the error that was occurring. When that error was occurring, the administrator could see information relating to what the other disks and other shelves that were around the failed disk were seeing at that point in time. In a Fibre Channel instance, there might be other disks that were in front of and behind the failed disk in the loop and some of those disks might have been causing cyclic redundancy check (CRC) errors or under-run errors on the Fibre Channel loop.

If the administrator has detailed knowledge of the system, then the administrator knows to look at the relevant section of the log to find information to help determine what problems the failed disk was encountering. For example, one area of the log includes specifics on the Fibre Channel interface as to errors and other events that could be occurring in the proximity of that disk that failed. Similarly, when using serial attached SCSI (SAS) products, there is another section of the log that provides more details on the surrounding drives on that physical loop as to why an individual disk might have been removed from the system.

There are number of preventative counters that cause trips that remove disks from the system. In this context, a "trip" is a notification that a disk is having problem(s) and that some action needs to be performed to address the problem(s). The trips are set up to recognize that the disk is not performing correctly and/or could be creating a problem. When connected via a Fibre Channel interface, a problematic disk gets bypassed. When connected via a SAS interface, the PHY (physical layer interface) gets disabled, so that the disk can not continue to cause problems.

There are multiple ways that a disk could fail, for example: a disk could simply stop working and provide a failure code, the disk could not respond to anything and timeout any request that is sent to it, or the infrastructure of the shelf could determine that the disk is malfunctioning to a point that it should be electronically isolated (with Fibre Channel, the switching hub would bypass the disk and with SAS, the PHY would get disabled).

The history information about the disk is relevant in attempting to determine and reproduce what caused the failure. This is because the history information includes a record of errors that were experienced by the disk. When that disk arrives at a service center, the history information can assist a technician by reviewing what the disk was doing and what the real failure was that was experienced. Having such information leads to a better chance of being able to reproduce the disk failure. Being able to reproduce the disk failure avoids the situation of the disk being tested and not having a problem occur. If upon testing, no problem is noticed, the disk could be put back into service even though it has a problem that could later recur.

One difficulty is that there is a time lag between when a disk fails and when the system knows about the failure. For example, if there is a protocol failure in the Fibre Channel, then the electronics of a shelf will electronically isolate the failed disk. If the events relating to a disk failure were shown on a time line, somewhere in the beginning of that time line, the electronics of the shelf isolate the disk. Then the system notices that the disk is unavailable, so the system reports that the disk has been removed from the system. About 20-30 seconds later, the shelf information propagates back up to the filer because the filer polls the shelf approximately every ten seconds to retrieve status information. So the information that the shelf electronically bypassed a disk needs to propagate through this polling interface up to the filer to provide more information about the device that was previously lost.

Reporting a Disk Failure and a Reason for the Failure

All of the relevant information is recorded and presented together, associated with the disk summary failure of what happened to that disk. This is done in a time window that is large enough to allow current information to be obtained from the disk shelf. For example, a disk fails and stops being used. Perhaps two minutes later, all of the enclosure services synchronize their respective information to provide as much information as possible. Then, the disk summary solution can be generated because all of the information from the disk shelf has been obtained and indicates, for example, if the disk was bypassed or if the PHY was disabled.

Integration with System Logging

The disk failure report can be a separately logged item, e.g., one item for each disk failure. Logging each disk failure separately is beneficial because the amount of information relating to a single disk failure might be significant, depending on how much pertinent data exists. Rather than trying to put all of the information in the disk failure report into the general system log, making the report a separate attachment to the log may be more efficient in terms of locating and analyzing the data in the future.

In an example of system logging utilizing AutoSupports, a weekly summary of disk failures that covers the preceding week could be attached to a weekly AutoSupport. In order to minimize AutoSupport traffic, sometimes AutoSupports are squelched if too many are generated in a short period of time. So the disk failure summary AutoSupport, if sent separately, might get squelched if another AutoSupport was generated immediately prior to it. However, the weekly AutoSupport is not squelched, so using the weekly AutoSupport as a "carrier" for the disk failure report would help ensure that all disk failures are reported.

Method for Analyzing Storage Device Failures

Figure 4:
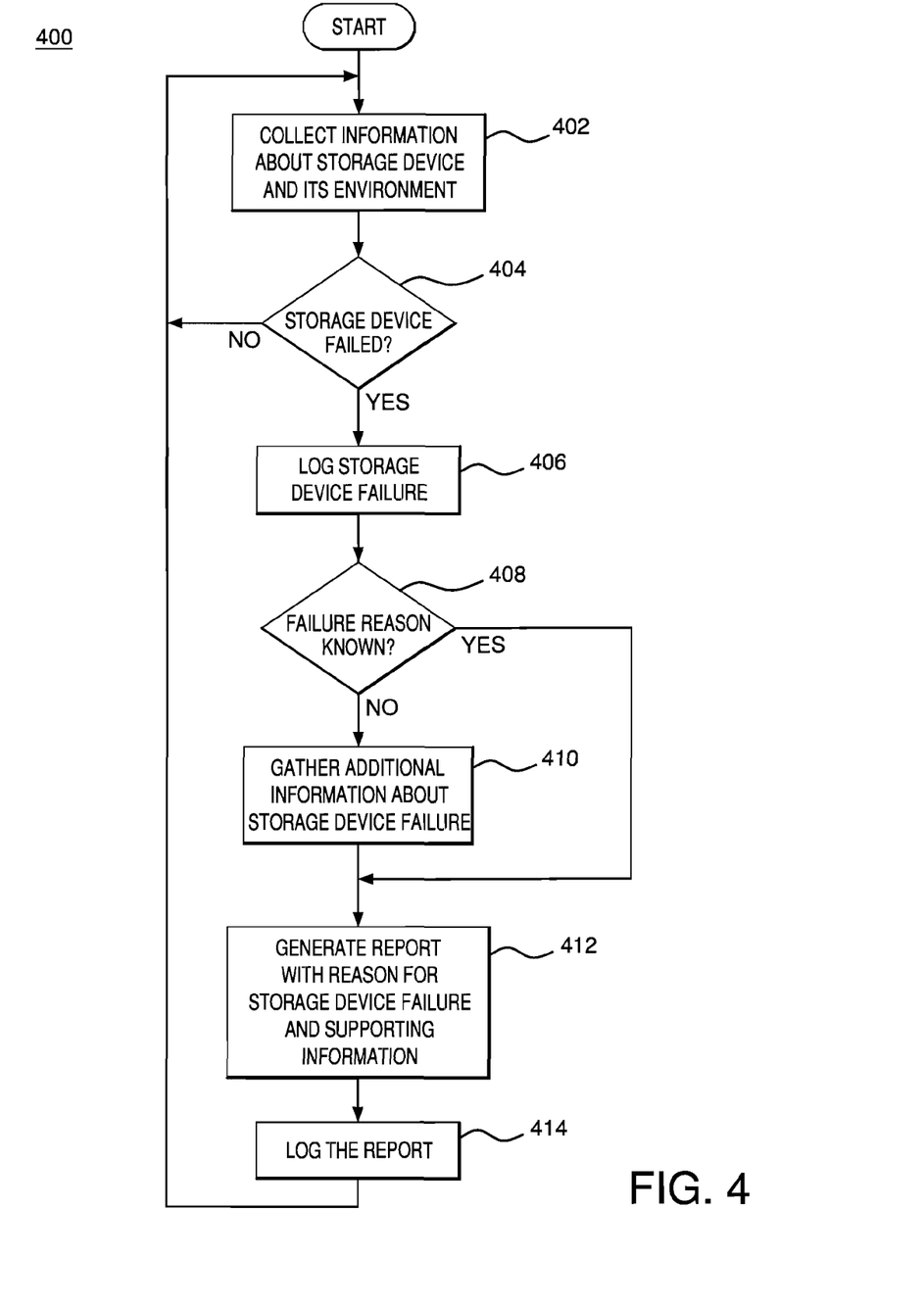
FIG. 4 is a flowchart of a method for analyzing a storage device failure.

FIG. 4 is a flowchart of a method 400 for analyzing a storage device failure. The method 400 begins by collecting information about the storage devices in a system and the storage devices' environment (e.g., information about the storage shelf where the storage device is located and surrounding storage devices; step 402). It is noted that information about all of the storage devices in a system is collected, but to simplify the discussion herein, only one storage device is described. As noted above, the information collected can include, but is not limited to, the number of errors encountered by the storage device, what those errors are, the number of input/output operations (I/Os) the storage device was performing, and the number of I/Os the storage device had errors with. The collected information may be stored in the storage device itself (e.g., the SMART data), in a centralized location (e.g., the shelf log data), or on the individual filer that is experiencing the problem with the storage device (e.g., storage health monitoring data).

A determination is made if a storage device has failed (step 404). A storage device failure can include, for example, the storage device ceasing communication with the storage system or physically removing the storage device from the storage shelf. If no storage device failure occurs, the method continues to collect information about the storage device and its environment (step 402). By continuously collecting information about the storage device, the information is readily available in the event of a failure and provides the most recent possible information to help analyze the reason for the failure. In addition to information about the storage device, information about the storage shelf can help determine a reason for the failure. For example, the shelf may have been experiencing an error when the storage device failed, and knowing what that error is can be helpful.

If the storage device fails (step 404), then the storage device failure is logged to the general system log (step 406). A determination is then made whether, based on presently available information, it is possible to determine a reason for the failure (step 408). It is noted that steps 408-414 of the method 400 are performed on the individual filer that is experiencing a problem accessing the storage device. If the failure reason cannot be determined based on the presently available information, then additional information about the storage device failure is gathered (step 410). As described above, the additional information can include information about the storage device itself, the shelf that the failed storage device is on, and surrounding storage devices. In one embodiment, the information includes a summary of how many I/Os have caused errors and the frequency that those errors are occurring (for example, the number of I/Os that have caused errors versus the total number of I/Os that the storage device has performed).

Once there is sufficient information to determine the reason for the storage device failure, the information is analyzed and a report is generated including the reason for the storage device failure and the information that was used to determine the reason (step 412). The storage device failure report is logged (step 414) and the method continues to collect information about the storage devices and their environment (step 402).

System Configured to Analyze Disk Failures

Figure 5:
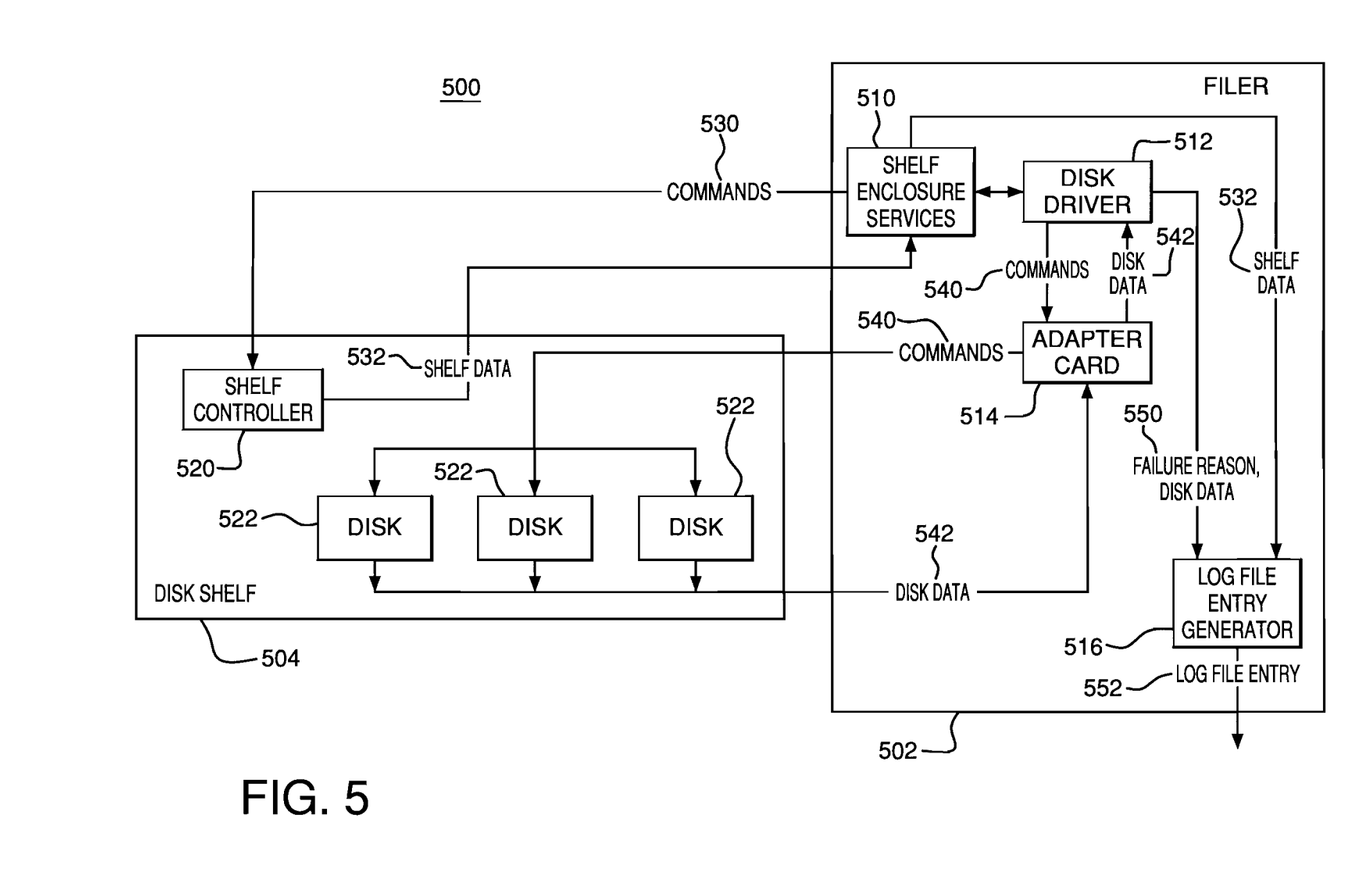
FIG. 5 is a block diagram of a system configured to analyze a disk failure.

FIG. 5 is a block diagram of a system 500 configured to analyze a disk failure. The system 500 includes a filer 502 and a disk shelf 504. The filer 504 includes shelf enclosure services 510, a disk driver 512, an adapter card 514, and a log file entry generator 516. The disk shelf 504 includes a shelf controller 520 and a plurality of disks 522.

In operation, the shelf enclosure services 510 sends commands 530 to the shelf controller 520. The commands 530 can include, but are not limited to, commands to collect data from the shelf controller 520. The shelf controller 520 sends shelf data 532 back to the shelf enclosure services 510. The shelf data 532 can be sent in response to commands 530 received from the shelf enclosure services 510 or periodically. As described above, the shelf data 532 can include, but is not limited to, information about each disk 522 on the shelf 504 and the connection between each disk 522 and the shelf 504. The shelf data 532 is also forwarded to the log file entry generator 516.

The disk driver 512 sends commands 540 to the adapter card 514, which are directed to a specific disk 522. The disk driver 512 contains intelligence to manage the individual disks 522. The adapter card 514 is specific to the type of physical connection to the disks 522. Different types of adapter cards 514 may be used, but all adapter cards 514 perform similar functions, namely, translating commands 540 from the disk driver 512 to a format usable by the disks 522. The commands 540 can include, but are not limited to, I/O commands and data gathering commands. Disk data 542 is sent from the disks 522 to the adapter card 514, which forwards the disk data 542 to the disk driver 512. The disk data 542 can include, but is not limited to, data read from a disk 522, the number of errors encountered by the disk, what those errors are, the number of input/output operations (I/Os) the disk was performing, and the number of I/Os the disk had errors with.

The shelf controller 520 and the disks 522 may be periodically polled to request shelf data 532 and disk data 542, respectively, instead of the data being "pushed" to the shelf enclosure services 510 and the disk driver 512. The shelf enclosure services 510 and the disk driver 512 can communicate with each other, to request data and to forward data back and forth.

The disk driver 512 contains the bulk of the intelligence involved in processing the disk data 542 and determining a reason for a disk failure. By continuously receiving the disk data 542, the disk driver 512 can actively monitor the current status of the disks 522. When a disk failure is detected, the disk driver 512 analyzes the available disk data 542 to determine a reason for the failure. Once the reason for the disk failure is determined, the disk driver 512 forwards the failure reason and the disk data 550 used to determine the reason to the log file entry generator 516.

The log file entry generator 516 creates a log file entry 552 that includes the failure reason and the supporting disk data 550. The log file entry generator 516 can also create a separate log file entry 552 that includes relevant shelf data 532. When assembling all of the relevant information to present to the storage system administrator, the filer 502 issues commands to various entities in the filer to forward the data. This information can include the shelf data 532, the disk data 542, and the combined failure reason and supporting disk data 550.

It is noted that the system 500 is exemplary, and that similar systems for different types of storage devices may be constructed. In such a system, there would also be a storage shelf controller (if a storage shelf was present), a storage device driver, an adapter to connect the storage device driver to the storage devices, and a log file entry generator. Regardless of the type of storage devices used, the system 500 would still operate in a manner similar to that described above.

The present invention can be implemented in a computer program tangibly embodied in a computer-readable storage medium containing a set of instructions for execution by a processor or a general purpose computer; and method steps of the invention can be performed by a processor executing a program of instructions to perform functions of the invention by operating on input data and generating output data. Suitable processors include, by way of example, both general and special purpose processors. Typically, a processor will receive instructions and data from a ROM, a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method for analyzing a storage device failure in a computer storage system, comprising the steps of:
    continuously collecting information about the storage device including at least one of an average input/output (I/O) time of the storage device or a maximum I/O time of the storage device;
    storing the collected information;
    polling shelf log data from a shelf controller of a storage shelf containing the storage device when an I/O error occurs, wherein the I/O error is time-correlated with one or more errors of the shelf log data;
determining whether the storage device has failed;
analyzing the stored collected information and the shelf log data by the computer storage system to determine a reason for the storage device failure;
wherein if the computer storage system cannot determine the reason for the storage device failure based on the stored collected information, the method further comprising:
gathering additional information about the storage device failure; and
said analyzing step analyzing the stored collected information and the gathered additional information by the computer storage system to determine the reason for the storage device failure, the gathered additional information including information about the storage shelf on which the storage device is located and information about adjacent storage devices on the storage shelf.

2. The method according to claim 1, wherein the collected information further includes at least one of: a number of errors encountered by the storage device, a number of I/O operations the storage device was performing, a number of I/O operations the storage device had errors with, Self-Monitoring, Analysis and Reporting Technology data of the storage device, or information about another component of the computer storage system.

3. The method according to claim 2, wherein the other component of the computer storage system includes at least one of: a storage shelf on which the storage device is located, a storage device driver, or an adapter driver.

4. The method according to claim 1, wherein said storing step includes storing the collected information on the storage device.

5. The method according to claim 1, wherein the gathered additional information includes at least one of: a number of errors encountered by the storage device, a number of I/O operations the storage device was performing, a number of I/O operations the storage device had errors with, or Self-Monitoring, Analysis and Reporting Technology data.

6. The method according to claim 1, further comprising the step of:
logging the storage device failure to a general system log file.

7. The method according to claim 1, further comprising the step of:
presenting the reason for the storage device failure and information used to determine the reason to a storage system administrator.

8. The method according to claim 1, further comprising the step of:
logging the reason for the storage device failure and information used to determine the reason to a general system log file.

9. The method according to claim 1, wherein the storage device is a disk drive.

10. The method according to claim 1, wherein the storage device is a solid state device.

11. A system for analyzing a storage device failure in a storage system, comprising:
a storage shelf including a shelf controller and a storage device; and
a storage device driver in communication with said storage device, said storage device driver configured to:
continuously collect information regarding said storage device and a storage shelf on which said storage device is located, wherein the information regarding said storage device includes at least one of an average input/output (I/O) time of the storage device or a maximum I/O time of the storage device;
poll shelf log data from the shelf controller of the storage shelf when an I/O error occurs, wherein the I/O error is time-correlated with one or more errors of the shelf log data;
analyze the collected information and the shelf log data to determine a reason for the storage device failure;
wherein if the system cannot determine the reason for the storage device failure based on the collected information, said storage device driver is configured to:
gather additional information about the storage device failure; and
analyze the collected information and the gathered additional information by the system to determine the reason for the storage device failure, the gathered additional information including information about the storage shelf on which the storage device is located and information about adjacent storage devices on the storage shelf.

12. The system according to claim 11, further comprising:
a log file entry generator in communication with said storage device driver, said log file entry generator configured to:
receive the collected information and the reason for the storage device failure; and
generate a log file entry including the collected information and the reason for the storage device failure.

13. The system according to claim 11, wherein said storage shelf includes a shelf controller in communication with said storage device driver and said collected information regarding said storage shelf includes information collected by said shelf controller regarding other storage devices on said storage shelf.

14. The system according to claim 13, further comprising:
a log file entry generator in communication with said storage device driver, said log file entry generator configured to:
receive the collected information and the reason for the storage device failure; and
generate a log file entry including the collected information and the reason for the storage device failure.

15. The system according to claim 11, wherein said storage device is a disk drive.

16. The system according to claim 11, wherein said storage device is a solid state device.

17. A non-transitory computer-readable storage medium storing a set of instructions for execution by a general purpose computer to analyze failure of a storage device in a computer storage system, the set of instructions comprising:
a collecting code segment for collecting information about the storage device and at least one other component of the computer storage system, wherein:
the information about the storage device includes an average input/output (I/O) time of the storage device or a maximum I/O time of the storage device; and
the at least one other component is not another storage device;
a storing code segment for storing the collected information;
a polling code segment for polling shelf log data from a shelf controller of a storage shelf containing the storage device when an I/O error occurs, wherein the I/O error is time-correlated with one or more errors of the shelf log data;

a determining code segment for determining whether the storage device has failed;

an analyzing code segment for analyzing the stored collected information and the shelf log data to determine a reason for the storage device failure;

a code segment for if the computer cannot determine the reason for the storage device failure based on the stored collected information:

gathering additional information about the storage device failure; and analyzing the stored collected information and the gathered additional information by the computer to determine the reason for the storage device failure, the gathered additional information including information about the storage shelf on which the storage device is located and information about adjacent storage devices on the storage shelf.

18. The storage medium according to claim 17, the set of instructions further comprising:

a logging code segment for logging the storage device failure to a log file.

19. The storage medium according to claim 17, the set of instructions further comprising:

a logging code segment for logging the reason for the storage device failure and information used to determine the reason to a log file.

20. The storage medium according to claim 17, the set of instructions further comprising:

a presenting code segment for presenting the reason for the storage device failure and information used to determine the reason to a storage system administrator.

* * * * *